(12) United States Patent
Gardner

(10) Patent No.: US 7,399,031 B2
(45) Date of Patent: Jul. 15, 2008

(54) DINETTE HAVING A COLLAPSIBLE TABLE ASSEMBLY

(75) Inventor: Stewart E. Gardner, Bristol, IN (US)

(73) Assignee: R-N-R International, Inc., Bristol (IN)

( * ) Notice: Subject to any disclaimer, the term of this patent is extended or adjusted under 35 U.S.C. 154(b) by 0 days.

(21) Appl. No.: 11/545,796

(22) Filed: Oct. 10, 2006

(65) Prior Publication Data

US 2007/0102975 A1 May 10, 2007

Related U.S. Application Data

(60) Provisional application No. 60/725,583, filed on Oct. 11, 2005.

(51) Int. Cl.
*B60N 2/34* (2006.01)
*A47B 83/02* (2006.01)
*A47C 13/00* (2006.01)

(52) U.S. Cl. .................. 297/118; 297/1; 297/158.1; 297/245

(58) Field of Classification Search .......... 297/245, 297/1, 118, 158.1
See application file for complete search history.

(56) References Cited

U.S. PATENT DOCUMENTS

| | | | | |
|---|---|---|---|---|
| 1,599,588 A | * | 9/1926 | Putnam | 297/118 |
| 2,613,369 A | * | 10/1952 | Lorenz et al. | 5/16 |
| 3,165,350 A | * | 1/1965 | Willson | 296/156 |
| 3,738,699 A | * | 6/1973 | Fain | 296/168 |
| 3,800,337 A | * | 4/1974 | Mizelle | 5/43 |
| 3,866,548 A | * | 2/1975 | Skonieczny | 108/79 |
| 3,880,458 A | * | 4/1975 | Jackson | 296/164 |
| 3,986,218 A | | 10/1976 | Mitzelle | |
| 4,200,329 A | * | 4/1980 | Inami et al. | 297/118 X |
| 4,282,613 A | * | 8/1981 | Violante | 297/118 X |
| 4,746,161 A | * | 5/1988 | Futrell | 296/24.3 |
| 5,088,135 A | | 2/1992 | Violette | |
| 5,197,776 A | * | 3/1993 | Brown | 296/65.03 |
| 5,460,104 A | | 10/1995 | Young, Sr. | |
| 5,639,141 A | * | 6/1997 | Hanemaayer | 296/156 |
| 5,718,479 A | * | 2/1998 | Rautenbach | 297/94 X |
| 6,398,164 B1 | * | 6/2002 | Fasse | 244/118.6 |
| 6,929,321 B1 | * | 8/2005 | Shrock | 297/118 |
| 7,108,226 B2 | * | 9/2006 | Quan et al. | 297/245 X |

* cited by examiner

*Primary Examiner*—Rodney B. White
(74) *Attorney, Agent, or Firm*—R. Tracy Crump

(57) ABSTRACT

This dinette for use in a recreational vehicle includes a collapsible table assembly, which shifts vertically between a raised table position and a lowered bed position and eliminates the need for support posts or legs. The collapsible table assembly includes a table top/bed deck mounted to a vertically shiftable carriage and supported by a four point linkage. The carriage rides on four wheels, which are seated in two opposed tracks of a wall bracket. The support linkage allows the table top to be raised and lowered between the table and bed positions. A gas piston or spring biases the table top toward the raised table position.

14 Claims, 10 Drawing Sheets

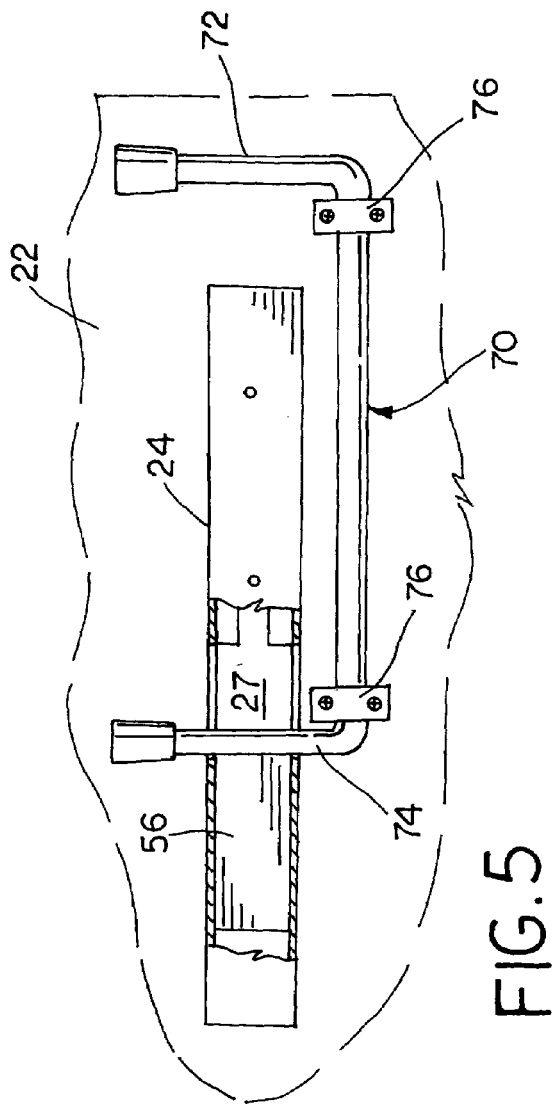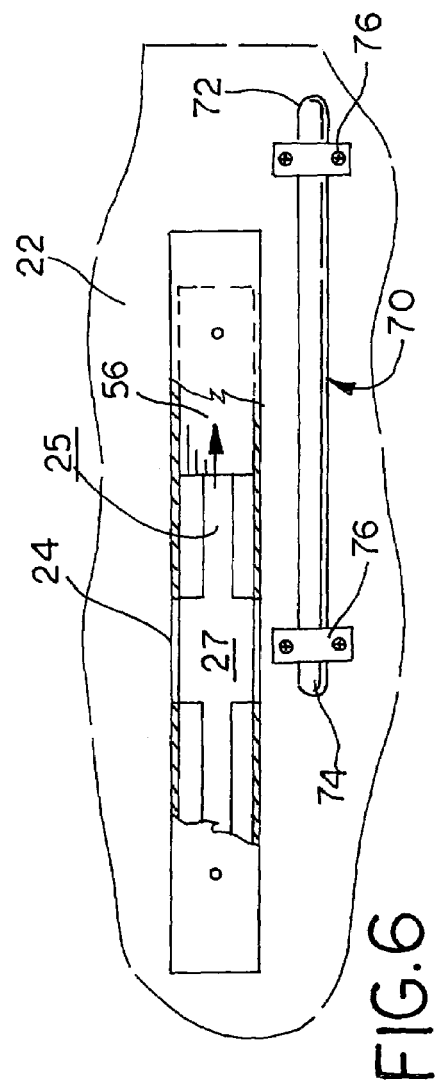
FIG.5
FIG.6

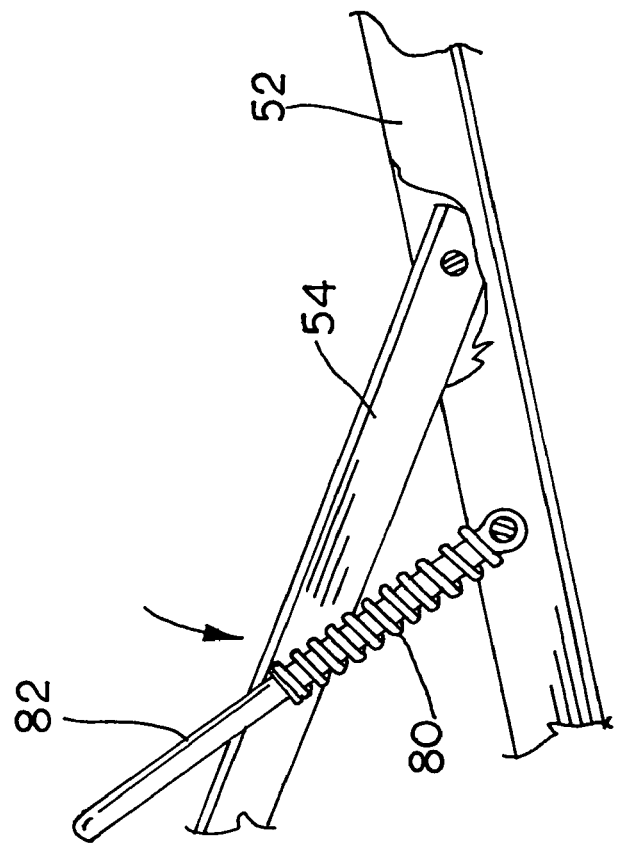
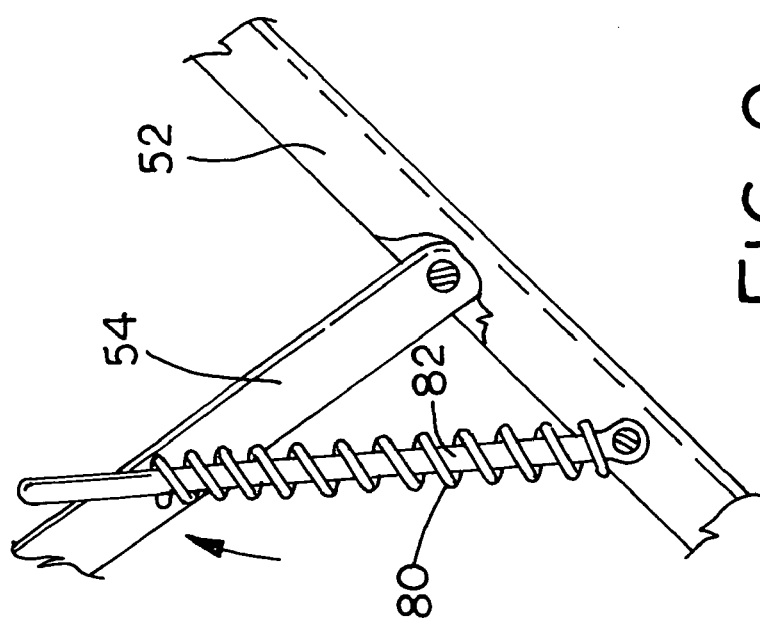

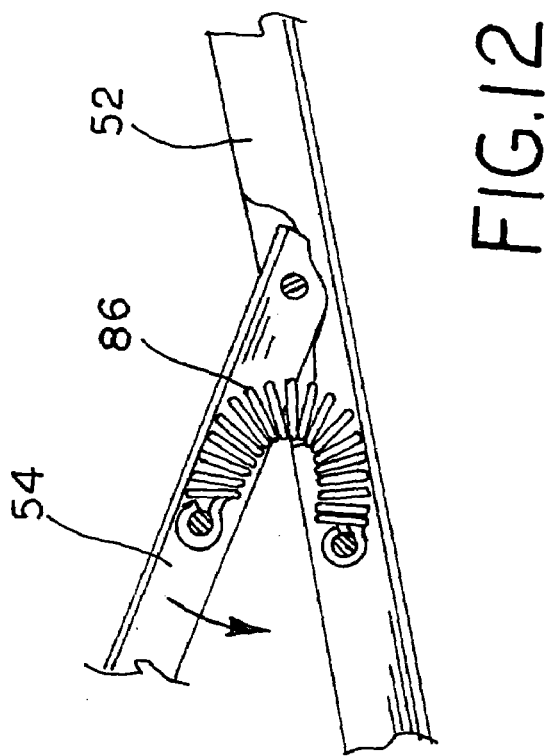
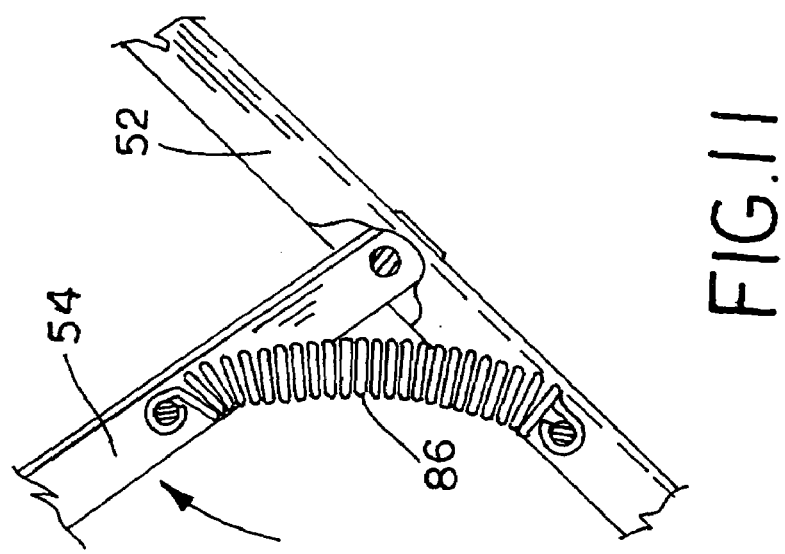

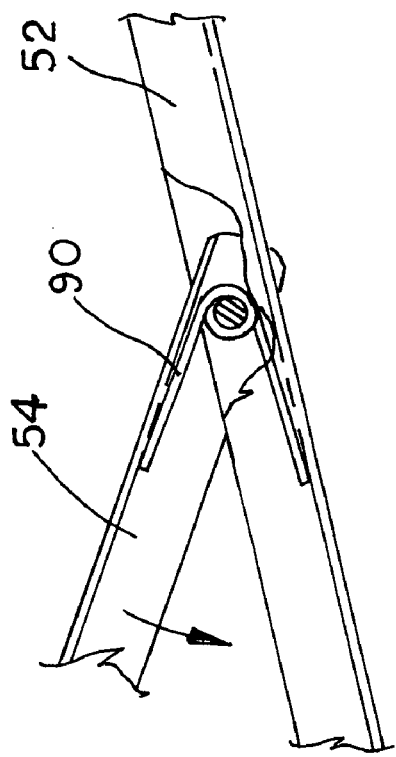
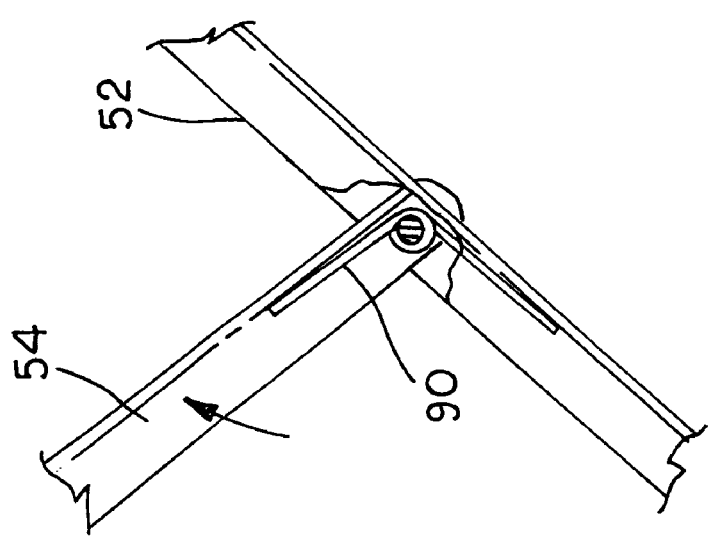

DINETTE HAVING A COLLAPSIBLE TABLE ASSEMBLY

This invention relates to a dinette used with recreational vehicles and particularly a dinette with a collapsible table assembly.

BACKGROUND OF THE INVENTION

Dinettes are common features in recreational vehicles. A typical dinette includes a pair of bench seats and a table supported by one or more table posts or legs. Because space is limited in recreational vehicles, dinettes often can be converted into a bed by lifting the tabletop from its support posts, removing the support posts, and inserting the tabletop between the dinette seats on small ledges on the seats. The problem with conventional convertible dinettes is that the support posts or legs must be stowed when used as a bed.

SUMMARY OF THE INVENTION

The dinette embodying the present invention eliminates the need for support posts or legs and allows the table top to be easily shifted between the raised table position and the lowered bed position. The dinette includes a collapsible table assembly, which shifts vertically between a raised table position and a lowered bed position. The collapsible table assembly includes a table top/bed deck mounted to a vertically shiftable carriage and supported by a four point supporting linkage. The carriage rides on four wheels, which are seated in two opposed tracks of a wall bracket. The linkage allows the table top to be raised and lowered between the table and bed positions. A gas piston urges the table top toward the raised table position. These and other advantages of the present invention will become apparent from the following description of an embodiment of the invention with reference to the accompanying drawings.

BRIEF DESCRIPTION OF THE DRAWINGS

The drawings illustrate an embodiment of the present invention, in which:

FIG. 5 is a top sectional view of a portion of the table assembly in the raised table position showing the lock bar in its locked position;

FIG. 6 is a top sectional view of a portion of the table assembly in the lowered bed position showing the lock bar in its unlocked position;

FIG. 9 is a partial side view of a second embodiment of the table assembly illustrating the table in the raised table position;

FIG. 10 is a partial side view of the table assembly of FIG. 9 illustrating the table in the lowered bed position;

FIG. 11 is a partial side view of a third embodiment of the table assembly illustrating the table in the raised table position;

FIG. 12 is a partial side view of the table assembly of FIG. 11 illustrating the table in the lowered bed position;

FIG. 13 is a partial side view of a fourth embodiment of the table assembly illustrating the table in the raised table position; and FIG. 14 is a partial side view of the table assembly of FIG. 13 illustrating the table in the lowered bed position.

DESCRIPTION OF THE PREFERRED EMBODIMENT

Figure 1:
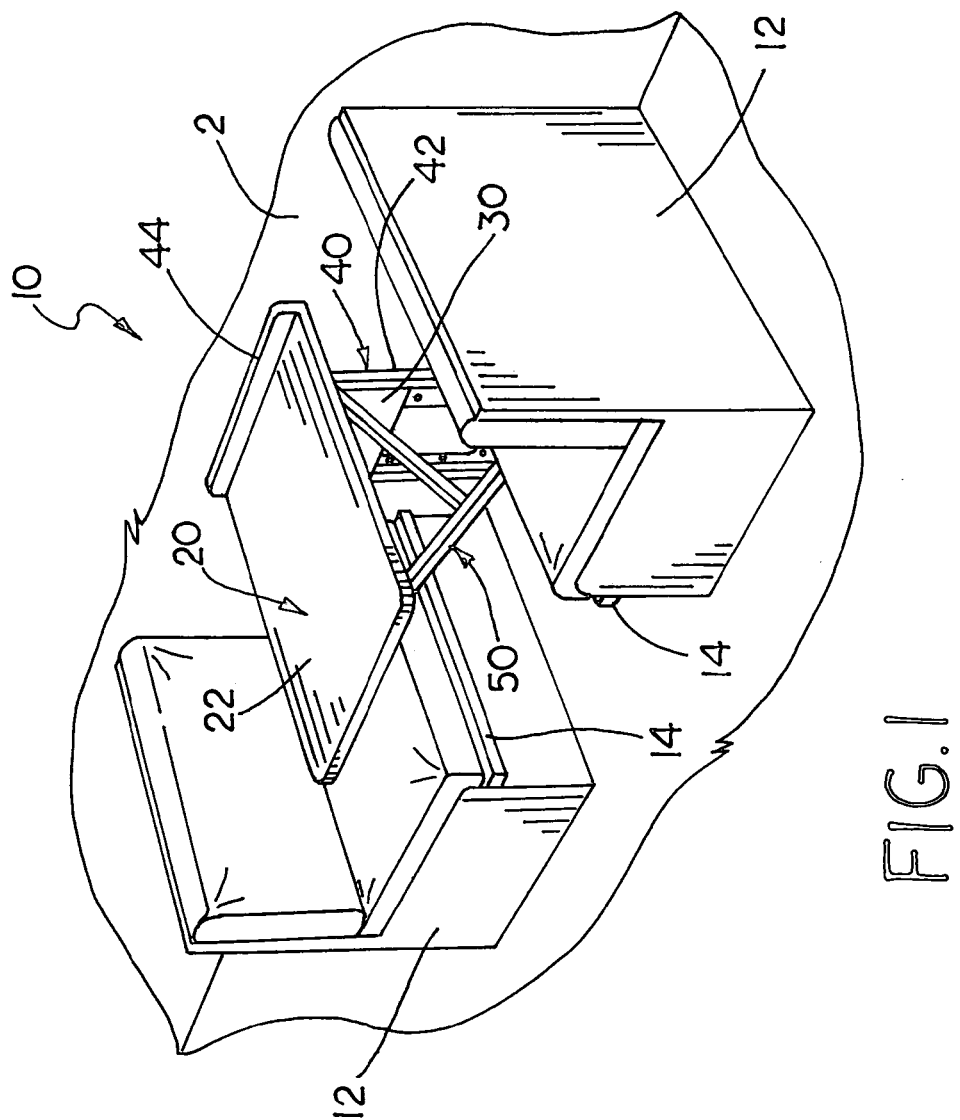
FIG. 1 is a perspective view of a dinette with its table top in the raised table position.
Figure 2:
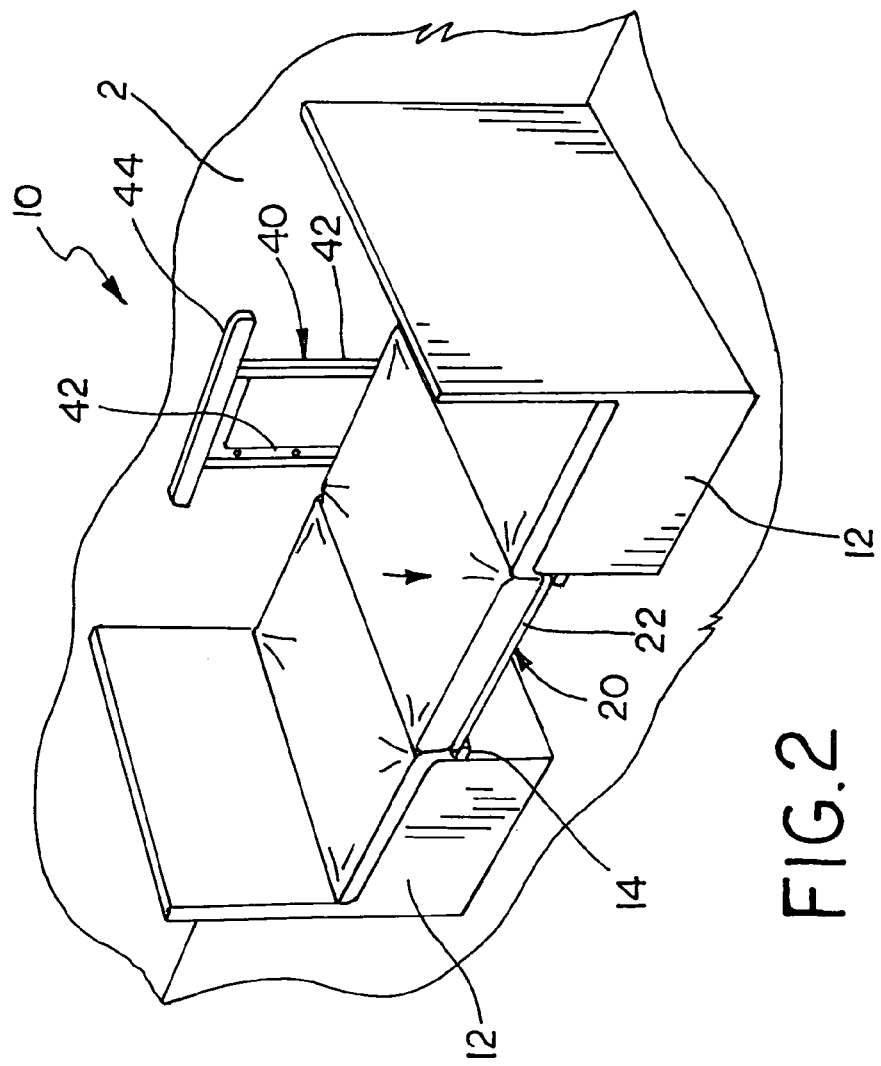
FIG. 2 is a perspective view of the dinette with its table top in the lowered bed position.
Figure 3:
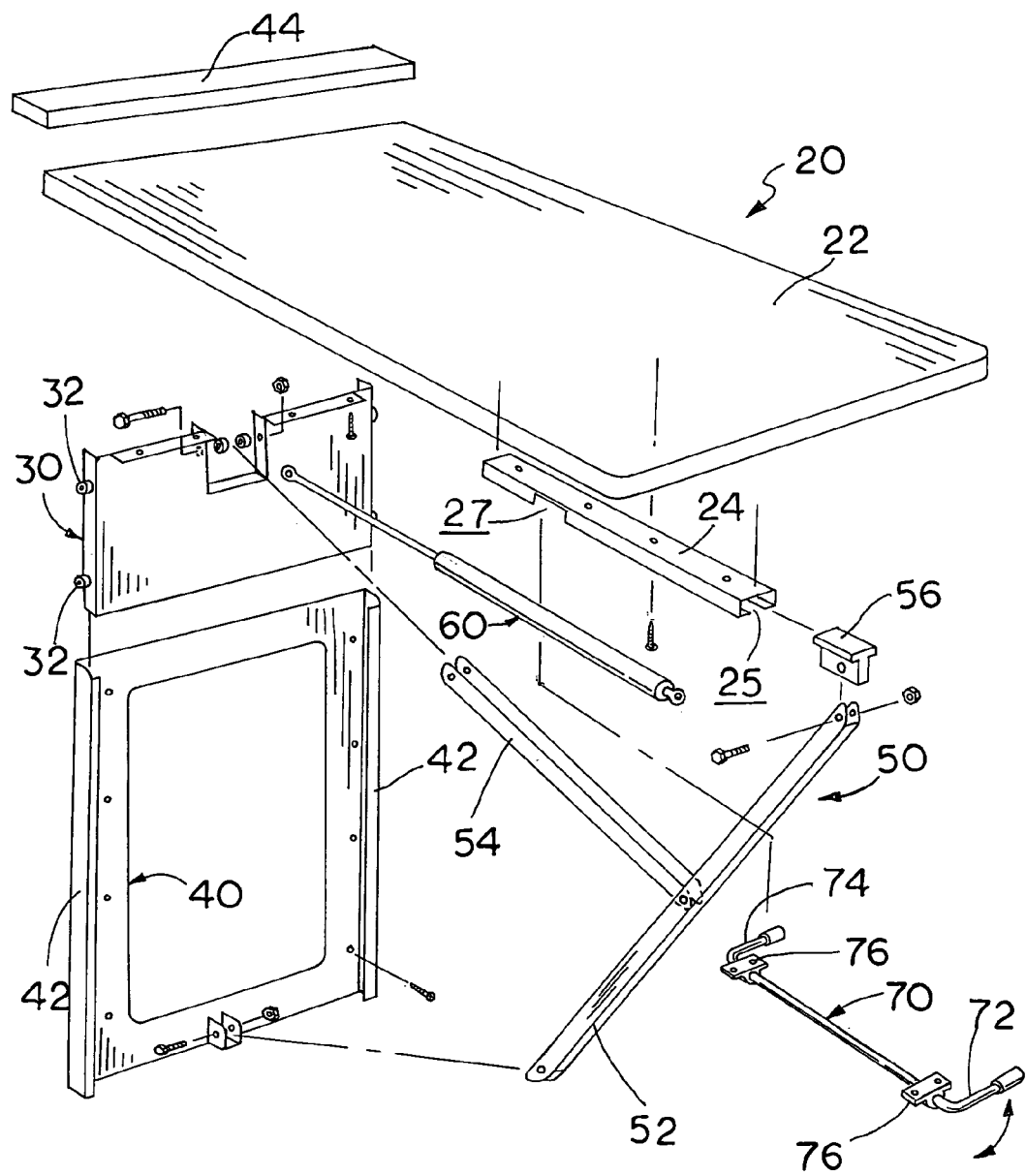
FIG. 3 is an exploded view of the table assembly of the dinette of FIGS. 1 and 2.
Figure 4:
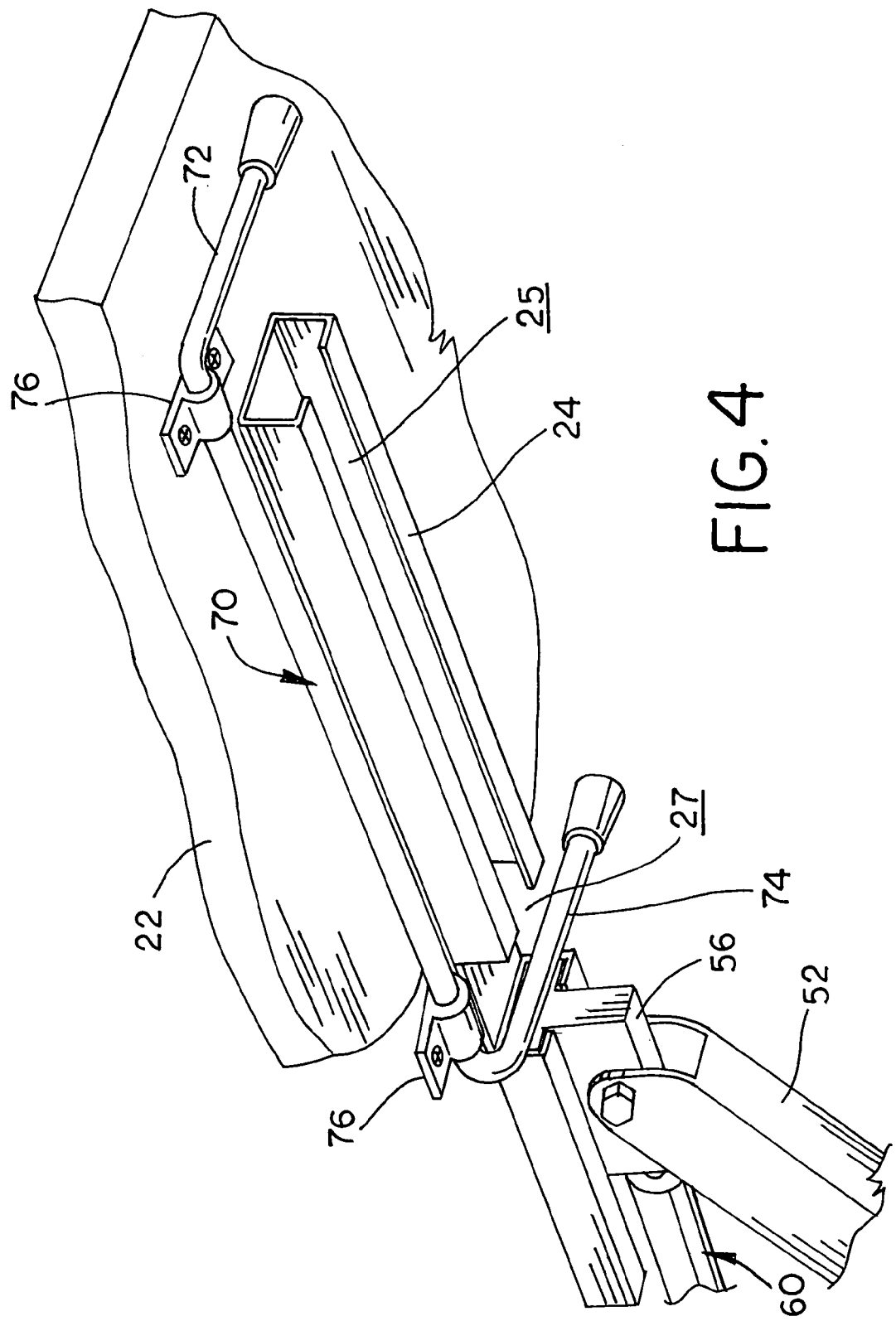
FIG. 4 is a partial perspective view of the under side of the table assembly of FIG. 3.

Referring now to the drawings, reference numeral 10 generally designates the dinette embodying the teaching of this invention. Dinette 10 is intended for use in recreational vehicles, but may be adapted for use in any application. Dinette 10 includes two facing benches 12 and a collapsible table assembly 20, which can be selectively moved between a raised table position (FIGS. 1 and 7) and a lowered bed position (FIGS. 2 and 8).

As best shown in FIGS. 3-6, table/deck assembly 20 includes a planar top 22 fastened to a wall mounted, vertically shiftable carriage 30 and supported by a four point linkage 50. Carriage 30 rides on four wheels 32, which are seated in two opposed tracks 42 of wall bracket 40. Wall bracket 40 is mounted to an interior sidewall 2 of the recreational vehicle by screws or other conventional methods. Wall bracket 40 also includes a stop flange 44. Top 22 extends outward from an interior side wall and is fastened to carriage 30, by screws, adhesives or other suitable means. A channel track 24 is mounted longitudinally to the bottom of top 22. Channel track 24 has a longitudinal slot 25 and a traverse notch 27 located at a mid point along its length. Supporting linkage 50 includes a main support arm 52 and a secondary support arm 54. Main support arm 52 is pivotally connected at one end to the bottom of wall bracket 40 and at the other end to a traveler 56 which rides within channel track 24. Secondary support arm 54 is pivotally connected at one end to carriage 30 and at the other end to a mid point of main support arm 52. A gas piston 60 is pivotally mounted between support arms 52 and 54 to bias top 22 to its raised table position. Piston 60 forces carriage 30 upward and biases top 22 toward the raised table position. Table assembly 20 also includes a lock bar 70 for securing top 22 in the raised table position. Lock bar 70 is pivotally mounted to the bottom surface of top 22 by two ear brackets 76. Lock bar 70 has two bent ends 72 and 74. One end 72 serves as a lever handle and the other end 74 serves as a cross bar that can be manually rotated to extend through notch 27 of channel track 24 to secure top 22 in the raised table position.

Figure 7:
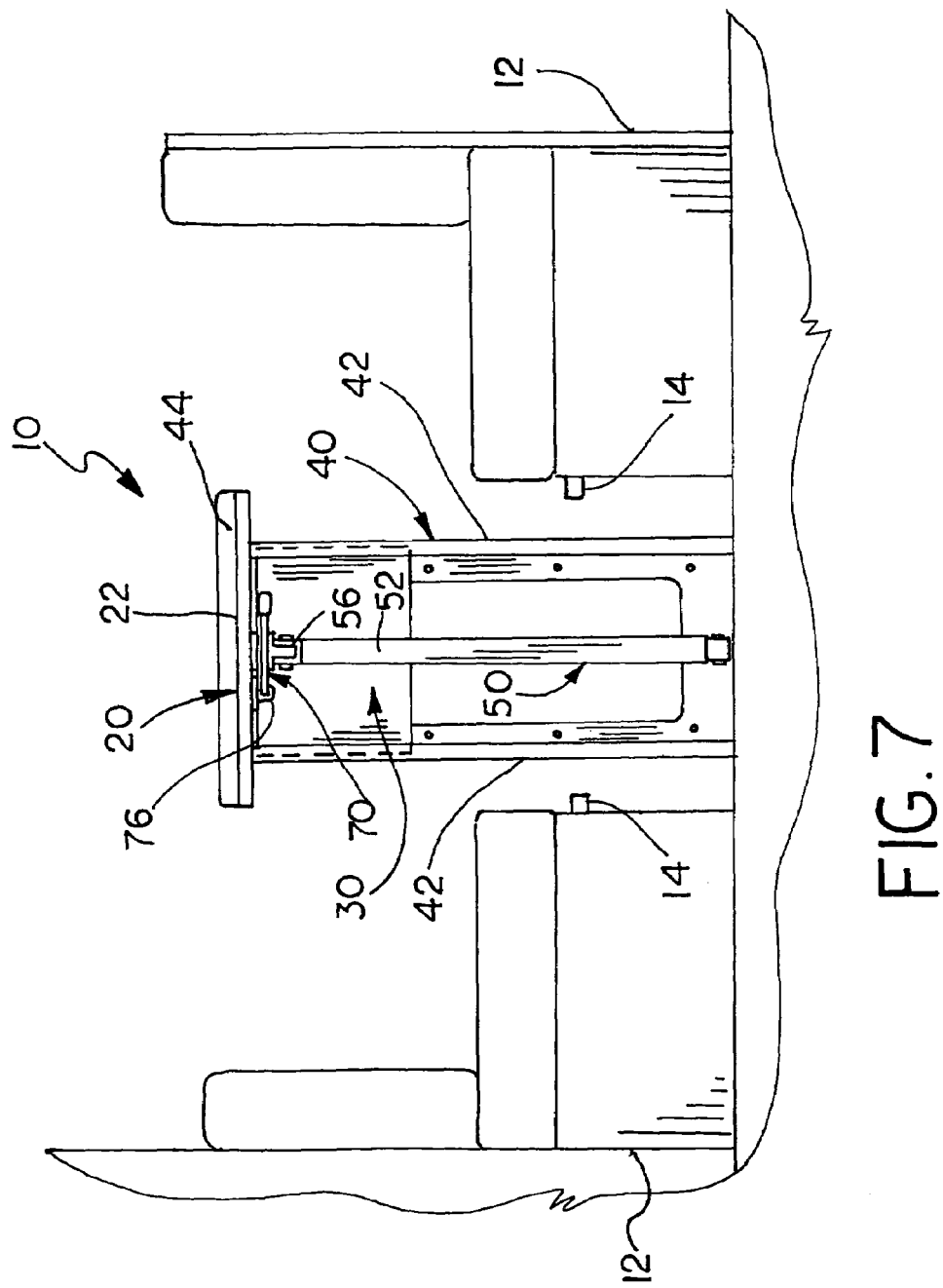
FIG. 7 is a side view of the dinette with its table top in the raised table position.
Figure 8:
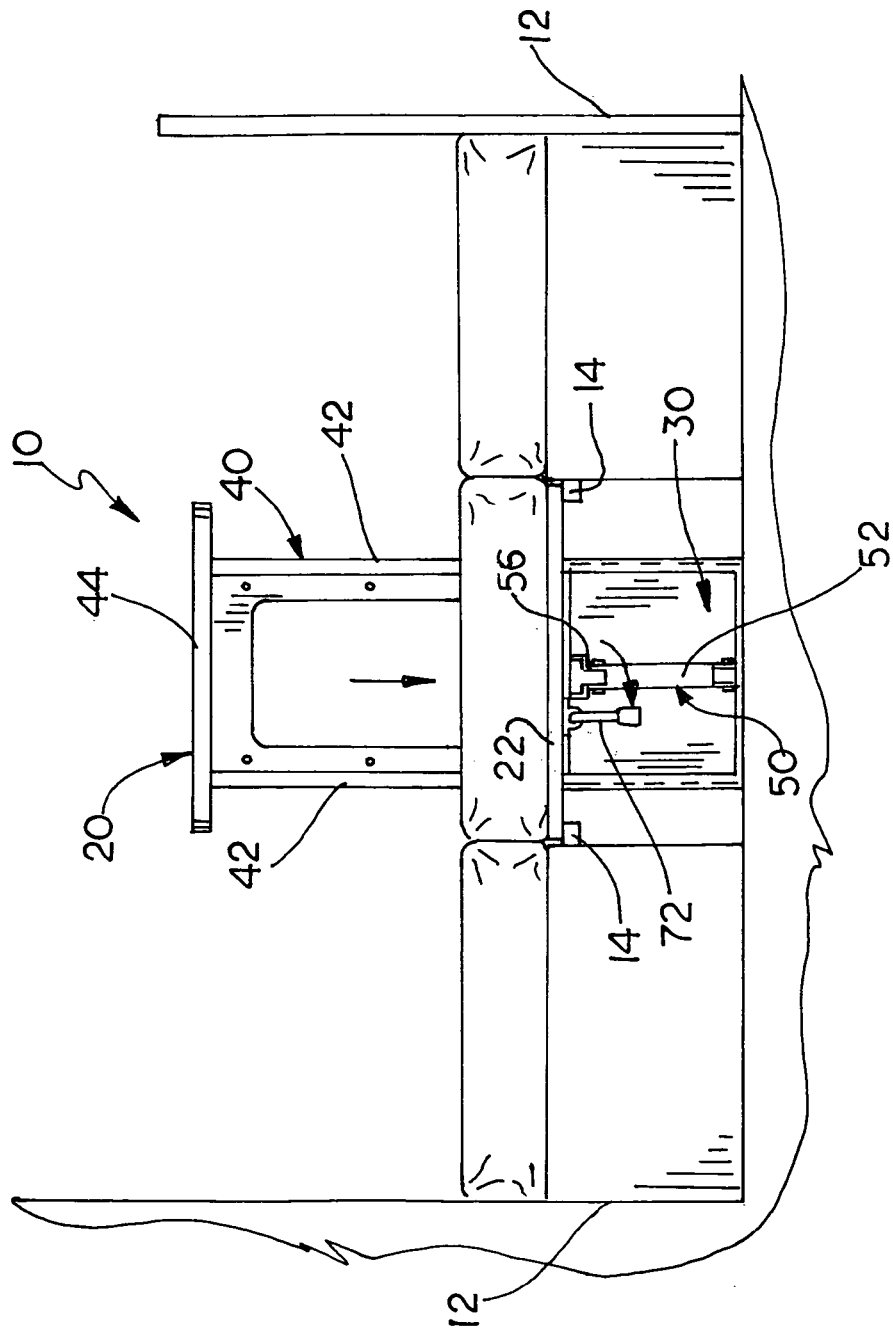
FIG. 8 is a side view of the dinette with its table top in the lowered bed position.

FIGS. 7 and 8 illustrate the use and operation of dinette 10. In the raised table position (FIG. 7), top 22 is elevated above bench seats 12 to form a table surface of the dinette 10. Piston 60 applies a force to supporting linkage 50 to urge top 22 upward. In the raised table position, top 22 abuts against bracket stop 44 and traveler 56 is pulled toward carriage 30 past notch 27 in channel track 24. Top 22 is secured by manually rotating lock bar 70 so that bent end 74 extends through notch 27 and blocks traveler 56 from moving outward along channel track 24. To collapse top 22 into the lowered bed position, lock bar 70 is manually rotated so that its bent end 74 pivots out of notch 27 allowing traveler 56 to slide outward along channel track 24. Since piston 60 forces top 22 upward, light downward force is manually applied to top 22 to collapse it into the lowered bed position. In the lowered bed position, top 22 rests atop side flanges 14 extending from the base of bench seats 12 to form an extended horizontal platform with the tops of bench seats 12.

FIGS. 9-14 illustrate alternative embodiments of the table assembly, which incorporate differing mechanisms for biasing top 22 upward to the raised table position. FIGS. 9 and 10 illustrate a second embodiment using a coil spring 80 seated over an extensible rod 82. Rod 82 is pivotally mounted to main link arm 52 and extends through a hole in secondary link arm 54. Coil spring 80 is seated between the link arms 52 and 54 to provide a compression force, which biases top 22 upward. FIGS. 11 and 12 illustrate a third alternative embodiment using another coil spring 86 connected at opposite ends between link arms 52 and 54 so that the coil spring bends with the pivotal movement of the linkage. FIGS. 13 and 14 illustrate a fourth embodiment using a leaf spring 90 mounted at the pivot point between link arms 52 and 54.

Persons skilled in the art will note that this invention eliminates the need for support posts or legs and allows the table top to be easily shifted between the raised table position and the lowered bed position. The vertically shiftable carriage and support linkage allows the table top to be raised and lowered without disconnecting any support posts or legs and without tools. Because the table top is fastened to the wall mounted shiftable carriage, the collapsible table assembly is more sturdy than conventional convertible dinette tables.

Persons skilled in the art will also note that embodiments of this invention may be modified within the teaching of this invention and that equivalent elements may be substituted or incorporated for certain components and structures described and illustrated herein while continuing to practice the principle of this invention. For example, the table may be made of solid wood, or laminate construction. The linkage arms can be formed and constructed as necessary to accommodate the collapsible movement of the table assembly. In addition, the size and dimensions of the bench seats and table assembly can be varied as required for any particular application. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. A table assembly for a dinette in a recreational vehicle having a side wall, the table assembly comprising:
    a first elongated track adapted to be vertically mounted to the sidewall;
    a carriage shiftably mounted to the first track for vertical movement along the length of the first track;
    a planar top mounted to and extending horizontally from the carriage for movement between a first position and a second position;
    a second elongated track mounted horizontally beneath the top;
    a linkage member having a first end adapted to be pivotally connected to the sidewall and a second end shiftably engaged with the second track for movement along the second track; and
    bias means connected between the carriage and the linkage member for biasing the table top between the first position and the second position.

2. The table assembly of claim 1 wherein the bias means is a gas prop.

3. The table assembly of claim 1 and a second linkage member having a first end pivotally connected to the carriage and a second end pivotally connected to the linkage member at the other end.

4. The table assembly of claim 1 and a traveler, wherein the second track having a channel, the traveler shiftably seated within the channel for movement along the length of the second track, the second end of the linkage member pivotally connected to the traveler.

5. The table assembly of claim 1 and means mounted to the top for operative engagement with the second track to lock the top in one of the first position and the second position.

6. A table assembly for a dinette in a recreational vehicle having a side wall, the table assembly comprising:
    a first elongated track adapted to be vertically mounted to the sidewall;
    a carriage shiftably mounted to the first track for vertical movement along the length of the first track;
    a planar top mounted to and extending horizontally from the carriage for movement between a first position and a second position;
    a second elongated track mounted horizontally beneath the top;
    a first linkage member having a first end adapted to be pivotally connected to the sidewall and a second end shiftably engaged with the second track for movement along the second track;
    a second linkage member having a first end pivotally connected to the carriage and a second end pivotally connected to the first linkage member at the other end; and
    bias means connected between the first linkage member and the second linkage member for biasing the table top between the first position and the second position.

7. The table assembly of claim 6 wherein the bias means is a gas prop.

8. The table assembly of claim 6 wherein the bias means is a coil spring.

9. The table assembly of claim 6 and a traveler, wherein the second track having a channel, the traveler shiftably seated within the channel for movement along the length of the second track, the second end of the first linkage member pivotally connected to the traveler.

10. The table assembly of claim 6 and means mounted to the top for operative engagement with the second track to lock the top in one of the first position and the second position.

11. A dinette for use in a recreational vehicle having a side wall, the table/bed comprising:
    a pair of bench seats spaced apart and facing each other, each of the bench seats having a horizontal sitting surface; and a table assembly,
    the table assembly includes a first elongated track vertically mounted to the sidewall,
    a carriage shiftably mounted to the first track for vertical movement along the length of the first track, a planar top mounted to and extending horizontally from the carriage for movement between a first position where the table top is raised above the sitting surface of the pair of bench seats and a second position where the table top aligns substantially in the plane of the sitting surface of the pair of bench seats, a second elongated track mounted horizontally beneath the top, a linkage member having a first end pivotally connected to the sidewall and a second end shiftably engaged with the second track for movement along the second track, and a piston connected between the carriage and the linkage member for biasing the table top between the first position and the second position.

12. The dinette of claim 11 and a second linkage member having a first end pivotally connected to the carriage and a second end pivotally connected to the first linkage member at the other end.

13. The dinette of claim 11 and a traveler, the second track having a channel, the traveler shiftably seated within the channel for movement along the length of the second track, the second end of the linkage member pivotally connected to the traveler.

14. The dinette of claim 11 and means mounted to the top for operative engagement with the second track to lock the top in one of the first position and the second position.

* * * * *